United States Patent [19]
Toda et al.

[11] Patent Number: 4,989,924
[45] Date of Patent: Feb. 5, 1991

[54] FLUID PRESSURE CIRCUIT

[75] Inventors: Hiroshi Toda, Kariya; Masashi Sawada, Chiryu; Hideyasu Miyata, Nagoya; Hiroaki Takeuchi, Toyota, all of Japan

[73] Assignee: Aisin Seiki Kabushiki Kaisha, Kariya, Japan

[21] Appl. No.: 330,447

[22] Filed: Mar. 30, 1989

[30] Foreign Application Priority Data

Mar. 31, 1988 [JP] Japan .................. 63-080924

[51] Int. Cl.⁵ .............................................. B60T 8/32
[52] U.S. Cl. ..................................... 303/113; 60/378; 137/567; 137/568; 303/61; 303/116; 303/119
[58] Field of Search ................... 303/2, 10, 61, 113, 303/115, 116, 119; 183/181 A; 60/378, 561, 592; 137/567, 568; 417/540

[56] References Cited

U.S. PATENT DOCUMENTS

| 3,601,452 | 8/1971 | Brunner | 303/10 X |
|---|---|---|---|
| 3,756,666 | 9/1973 | Leiber | 303/10 |
| 4,245,963 | 1/1981 | Hutchins et al. | 417/450 X |
| 4,695,100 | 9/1987 | Miles | 303/10 |

FOREIGN PATENT DOCUMENTS

| 2138626 | 1/1978 | Fed. Rep. of Germany | 60/561 |
|---|---|---|---|
| 0113545 | 11/1985 | Japan | 303/113 |
| 1384566 | 2/1975 | United Kingdom | 303/116 |
| 1590003 | 9/1976 | United Kingdom | 303/10 |

Primary Examiner—Douglas C. Butler
Attorney, Agent, or Firm—Burns, Doane, Swecker & Mathis

[57] ABSTRACT

A fluid pressure circuit is provided in which two independent systems are provided with a pressure generator for supplying pressure through each of the circuits so as to operate the brake system of a vehicle in an antiskid mode. The fluid pressure circuits have a phase difference of a half a period with respect to each other so as to provide for a continuous pressure to each of the brake systems of the independent fluid pressure systems. By providing such an arrangement, pulsation effects of each independent system are reduced without adversely influencing the pressure generator apparatus and while decreasing the noise associated with the operation of the fluid pressure system under such operating conditions.

9 Claims, 2 Drawing Sheets

FLUID PRESSURE CIRCUIT

BACKGROUND OF INVENTION

The present invention relates to a fluid pressure circuit provided with a pressure generator, and particularly to a fluid pressure circuit, which includes two independent systems provided with a pressure generator for supplying pressure to each of circuits, respectively.

Conventionally, a fluid pressure circuit of such type was disclosed in Patent Laid-Open Publication No. 53-43180. This circuit is provided with a reduction chamber on the ejecting or output side of a pressure generator. The chamber is stiff with respect to the pressure as it is a metal member having a cross-sectional surface larger than that of a conduit of the fluid pressure circuit, thereby absorbing/reducing the ejecting or output pulsation of the pressure generator due to the elasticity of the operating fluid in said chamber. Therefore, this type of circuit has promoted the reduction of the roar sound or noise associated with operation of the circuit and the advancement of the pedal feel (the relief of the shock applied to the brake pedal) when the circuit is used in the antiskid apparatus.

However, this apparatus as described above reduces the ejecting or output pulsation of the pressure generator according to the operating fluid in the reduction chamber. As a result, a problem has arisen in that the elasticity of the operating fluid in the reduction chamber is changed according to the absolute pressure of the fluid pressure and a sufficient reduction effect cannot be obtained as it requires a volume larger than the known predetermined volume utilized in this field, which would require the size of such circuits to be increased.

Accordingly, an object of the present invention is to provide a fluid pressure circuit which can obtain the predetermined reduction effect independent upon the change of the fluid pressure from the pressure generator.

SUMMARY OF THE INVENTION

The present invention is provided with fluid pressure circuits corresponding to two systems which are independent to each other. A pressure generator supplies the fluid pressure to each of the fluid pressure circuits which have a phase difference of a half period to each other. A body is provided with has an inner hole for allowing each of the passages on the ejecting side of said pressure generator to be communicated with each other. A piston is provided in a fluid-tight manner into the inner hole of each body to partition or form a pari of damper chambers which open and close the inlet and the outlet of each of passages on the ejecting side of each of the pressure generators and an orifice is open to the outlet of the ejecting side passages of each of the pressure generators.

According to the present invention as described above, the ejecting or output pulsation of one system is transmitted/absorbed through the piston to the passage of the ejecting or output side in the other system having a phase difference of a half period as the piston is moved according to the pressure difference between both damper chambers in the passage of the ejecting or output side on the other system having a phase difference of a half period. Therefore, the pulsation of each output side can be reduced by half without influencing the fluid pressure of the inhalating or incoming fluid from the pressure generator to decrease the noise associated with operation of the fluid pressure circuit.

Also, fluid pressure circuits of the present invention are connected to each conduit for coupling the brake master cylinder and the antiskid actuator through the check valve. The outlet of the passage on the ejecting side of the pressure generator allows the fluid to flow only into the conduit passage, while the passage of each of inhalating or inlet sides of the pressure generators is connected to the reservoir which can receive the predetermined amount of the operating fluid, thereby advancing the pedal feel by reducing the ejecting pulsation when the circuit is utilized with the antiskid actuator.

BRIEF DESCRIPTION OF THE DRAWINGS

The above and other objects of the present invention will be seen by reference to the description taken in connection with the accompanying drawings, in which.

DETAILED DESCRIPTION OF A PREFERRED EMBODIMENT OF THE INVENTION

One embodiment of the fluid pressure circuit according to the present invention will be explained below.

Figure 1:
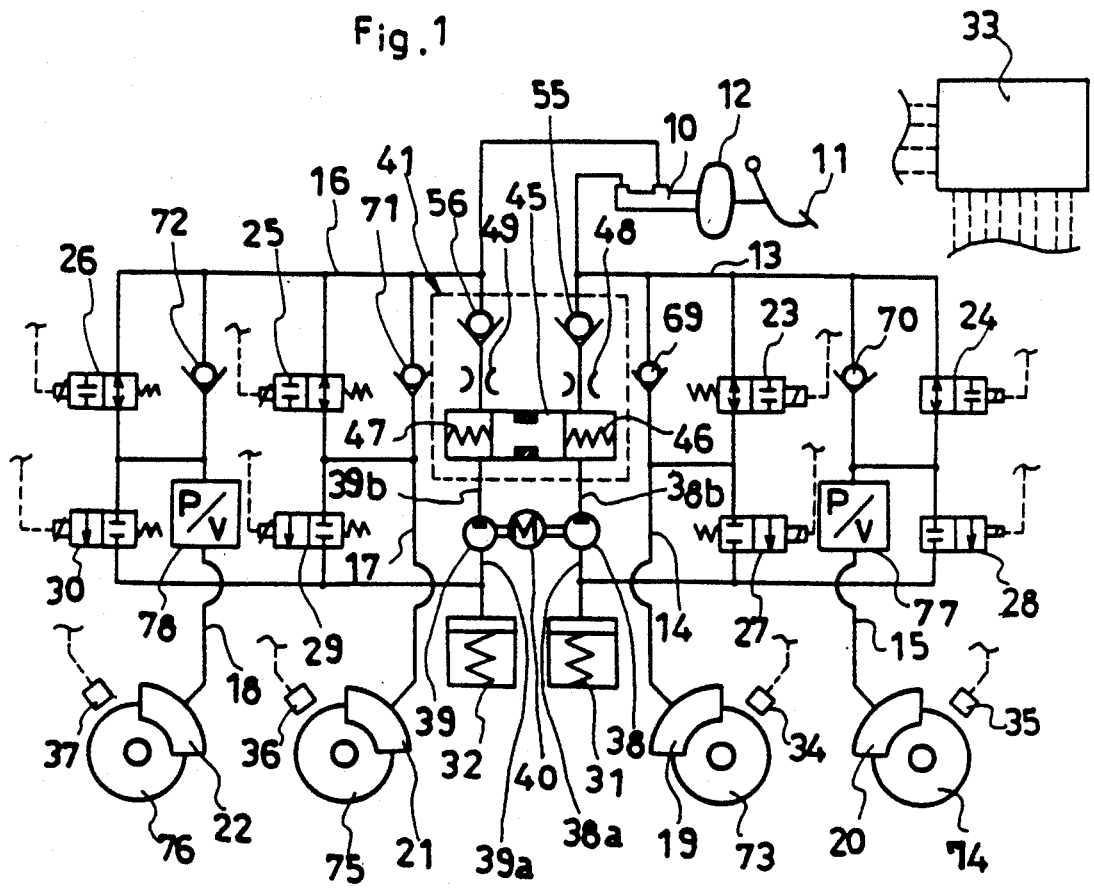
FIG. 1 is a circuit illustrating one embodiment of the fluid pressure circuit according to the present invention.
Figure 2:
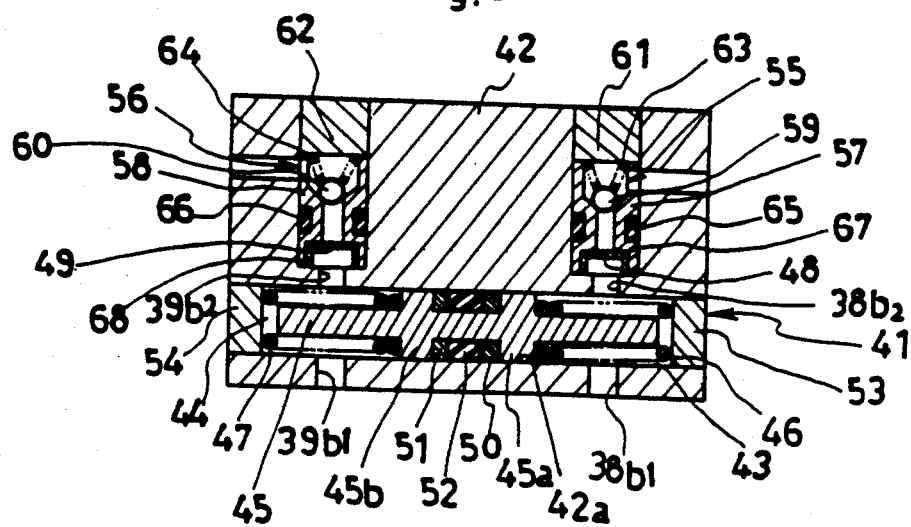
FIG. 2 is an explanation view of the reduction apparatus in FIG. 1.

FIG. 1 and FIG. 2 illustrate an example of one embodiment of the fluid pressure circuit of the present invention to the direct controlled antiskid control apparatus of the discharge type. In FIG. 1, brake master cylinder 10 (below referred to as the master cylinder) is operated by means of brake pedal 11. The front pressure chamber of master cylinders 10 is connected through first conduit passage 13 to brake wheel cylinder (below refereed to as the wheel cylinder) 19, 20 of one system, supply switchable valves 23, 24 and second conduit passages. The rear pressure chamber of master cylinder 10 is connected to wheel cylinders 21, 22 of the other system though first conduit passage 16, supply switchable valves 25, 26 and second conduit passages 17, 18. Each of second conduit passages 17, 18 is connected through each of discharge switchable valves 29, 30, respectively, to reservoir 32 which can receive a predetermined amount of the operating fluid.

Supply switchable valves 23-26 are the electromagnetic actuated opening/closing valve type having two ports-two positions which forces first conduit passage 13, 16 connected to master cylinder 10 and second conduit 14, 15 connected to master cylinder 10 to be communicated with each other when deenergized and also interrupts the communication of the same conduit passage when energized. Also, discharge switchable valves 27-30 are of the electromagnetic actuated opening/closing valve type having two ports and two positions and interrupts the communication between each of second conduit passages and reservoirs 31, 32 when deenergized, as well as allows communication between each of second conduit passages and reservoirs 31, 32 when energized. The switching operation of both of the switchable valves 23-26, 27-30 (deenergization, energization) is controlled by control unit 33, so that these valves are deenergized together when the brake operation of the vehicle is not required, and also when the antiskid apparatus is controlled, the denenergization and the energization of these valves is repeated by means of control unit 33 in response to the detecting signal from each of speed sensors 34-37 for detecting the locking state of each of the car wheels. Only, first conduit passage 13 and each of second conduit passages 14, 15 are connected to each other through check valves 69, 70 bypassing each of supply switchable valves 23, 24. First conduit passage 16 and each of second conduit passages 17, 18 are connected to each other through check valves 71, 72 bypassing each of supply switchable valves 25, 26. Each of check valves 69-72 is a one direction valve allowing the fluid to flow from second conduit passages into first conduit passages, so that the return of the operating fluid during the removal of the brake operation is advanced.

Each reservoir 31, 32 is provided with a piston and spring arrangement, so that it can receive the operating fluid discharged through each of discharge switchable valves 31-30 therein. Each of the reservoirs 31, 32 is respectively connected to passages 38a, 39a of the inhalating or intake side of fluid pressure pumps 38, 39. Each fluid pressure pump 38, 39 is a plunger pump having opposite movement with respect to each other, and is operated by means of one electrical power motor 40. The fluid pressure pumps 28, 39 and electrical power motor 40 comprise the pressure generator of the present invention. Electrical power motor 40 is configured so as to be controlled by means of control unit 33 to be simultaneously operated by initiating the opening/closing control of each of switchable valves 23-26 and 27-30.

Each of the passages 38a, 39a on the ejecting or output side of each of the fluid pressure pumps 38, 39 is connected to a reduction apparatus 41 of the present invention. In this embodiment, reduction apparatus 41 is shown in FIG. 2 and is comprised of a body 42 having inner hole or opening 42a for allowing each of the passages 38a, 39a on the ejecting side of each of fluid pressure pumps 38, 39 to be communicated with each other. A floating piston 45 is received fluid-tightly into inner hole 42a of each of bodies 42 to partition/form a pair of damper chambers 43, and 44, opening inlets 38b1, 39b1 and outlets 38b2, 39b2 for each ejecting side passages 38b, 39b. Springs 46, 47 are mounted elastically in each of the damper chambers 43, 44 so as to be faced against each other through floating piston 45. Orifices 48, 49 are open to outlets 38b2, 39b2 of each ejecting side passages 38b, 39b. Floating piston 45 is provided with a pair of land portions 45a, 45b and an O ring 52 fixedly disposed between each of the land portions 45a, 45b, both sides of which are narrowed between backup rings 50, 51, thereby maintaining fluid tightness between both of the damper chambers 43, 44. Also, outlets 38b2, 39b2 of each of ejecting side passages 38b, 39b is respectively connected through orifices 48, 49 to each of the first conduit passages 13, 16. Check valves 55, 56 for allowing the fluid to flow into only first conduit passages 13, 16 are disposed in each of outlets 38b2, 39b2. EAch check valve 55, 56 comprises seat members 57, 58 inserted fluid-tightly into holes or openings which are respectively perforated in body 42 in the middle of each of the outlets 38b2, 39b2. Balls 59, 60 are positioned on the seat surface of the opening side on first conduit passages 13, 16 which are formed in each of the seat members 57, 58. Springs 63, 64 in contact at one end with plugs 61, 62, are inserted into the openings formed in body 42 in the middle of each of the outlets 38b2, 39b2, to apply an elastic force in the direction for urging seating of each of the balls 59, 60 on the seat surface. Cup type members 67, 68 are inserted into the passage formed by seat members 57, 58. Orifices 48, 49 are formed in each of the cup type members 67, 68. Reference numbers 59, 54 denote plugs inserted fluid-tightly into the opening of both ends of hole or opening 42a in body 42, and reference numbers 65, 66 are O rings inserted into a circular groove formed around the periphery of seat members 57, 58. Proportional valves 77, 78 mounted in the middle of each of second conduit passages 15, 18.

In operation, brake pedal 11 is depressed to generate the fluid pressure in both of the pressure chambers of master cylinder 10. Since each of the switchable valves is kept at the position of deenergization as shown in FIG. 1, the fluid pressure in master cylinder 10 is applied to wheel cylinders 19-22 through each of first conduit passages 13, 16, each of supply switchable valves 23-26 and each of second conduit passages 14-18, thereby performing the braking of each of the vehicle wheels.

When the wheel axle is braked as described above during movement of the vehicle at a predetermined speed, if the control unit 33 detects the state of incipient lock of the wheel 73 on the basis of the detected signal from speed sensor 34 of the vehicle, supply switchable valve 23 and discharge switchable valve 27 are energized to reduce the fluid pressure of wheel cylinder 19 as well as electrical power motor 40 is energized to operate fluid pressure pumps 38, 39. If the fluid pressure of wheel cylinder 19 is reduced so as to permit the restoration of the original rotation speed of wheel 73 based on the detecting signal from speed sensor 34 of the vehicle, each of the switchable valves 23, 27 is deenergized, and the ejecting or output pressure from fluid pressure pump 38 is applied with the fluid pressure from master cylinder 10 to wheel cylinder 19, so that the fluid pressure in wheel cylinder 19 is increased, or discharge switchable valve 27 is deenergized to retain the fluid pressure in wheel cylinder 19.

In this manner, responsive to the signal from speed sensor 34 of the vehicle, each switchable valve 23, 27 are repeatedly energized or deenergized to reduce or increase and maintain the fluid pressure in the wheel cylinder, with the result that lock-up of the wheel is accurately prevented. Also, this embodiment is illustrating the antiskid control when wheel 73 is reached at the state of incipient lock-up, but the energization and deenergization of each of the switchable valves is controlled in the same manner with respect to the other wheel according to the signal representative of wheel speed.

Figure 3:
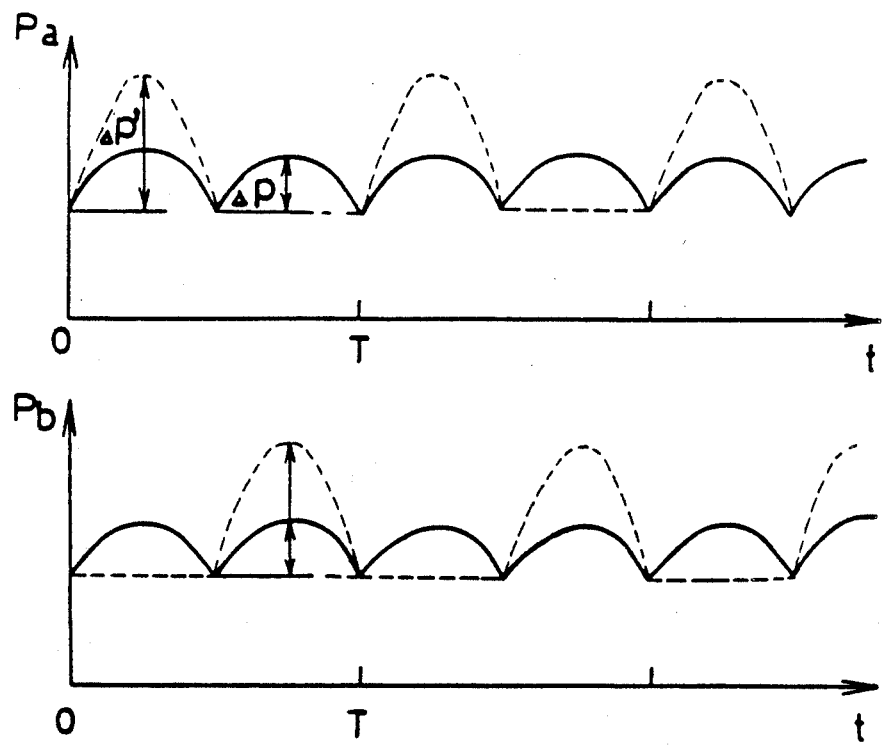
FIG. 3 is a graphical representation of the ejecting pressure from the fluid pressure pump in FIG. 2.

Fluid pressure pumps 38, 39 of the opposed plunger type has a phase difference of a half period is operated during the antiskid control, and the ejecting or outlet pressure from each of fluid pressure pumps 38, 39 is applied through reduction apparatus 41 to first conduit passages 13, 16. The characteristic of ejecting or outlet pressure Pa, Pb in each of fluid pressure pumps 38, 39 is represented by the solid line as shown in FIG. 3. That is to say, when the plunger of fluid pressure pump 38 moves to the discharge stroke, the plunger of fluid pressure pump 39 moves to the intake stroke. If reduction apparatus 41 is not installed therein, the characteristics of the ejecting pressure are represented by the dotted line as drawn in FIG. 3 and pulsations having a pulsation width of P occur, respectively. According to the present invention, that is, when fluid pressure pump 38 is in the ejecting or discharge stroke and fluid pressure pump 39 is in the inhalating or inlet stroke, floating piston 45 in FIG. 2 is moved leftwardly in response to the pressure difference between both of the damper chambers 43 and 44 to increase the volume of damper chamber 43 and transmits the fluid pressure of fluid pressure pump 38 to fluid pressure pump 39 as well as transferring the operating fluid ejected or discharged from fluid pressure pump 38 to fluid pressure pump 39 alternately repeated per half period as the floating piston 45 is moved so as to provide continuous output. Accordingly, the ejecting pressure is smoothly represented as shown in FIG. 3 and the pulsation pressure P is slightly reduced by half. As a result, the roar sound or noise level created by the ejecting pulsation of the fluid pressure pump can be reduced, and the undesirable shock of brake pedal 11 due to the pulsation can be relieved to increase the pedal feel. Also, the pulsation width and the fluid amount transferred/absorbed from one of the fluid pressure pumps during discharge to the other fluid pressure pump during intake can be changed if the diameter of each of springs 46, 47 and each of orifice 48, 49 and the diameter of floating piston 45 is properly selected. Also this embodiment illustrates an example of an antiskid control apparatus which is directly controlled such as the discharge type, but the present invention can be used in various antiskid control apparatus by properly selecting the switchable valve.

Figure 4:
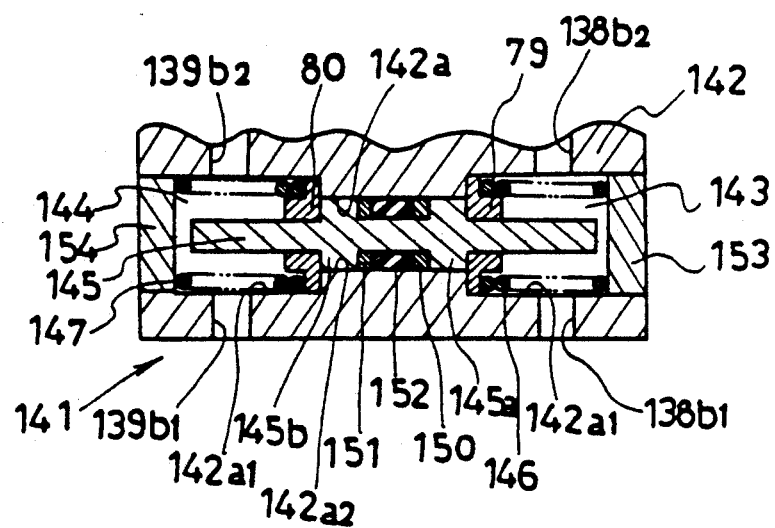
FIG. 4 is a view illustrating a modified example of the reduction apparatus in the present invention.

FIG. 4 represents a modified example of the pressure reduction apparatus of the present invention. This embodiment is configured so that inner hole 142a1 formed in body 142 of reduction apparatus 41 is in the form of the step having large diameter portion 142a1 and small diameter portion 142a2, each of land portions 145a, 145b of floating piston 145 is guided into small diameter portions 142a2, each of damper chambers 143, 144 is formed in large diameter portions 142a1 respectively, retainers 79, 80 engaged with the step of inner hole 142a by means of springs 146, 147 being elastically mounted in each of damper chambers 143, 144 are respectively contacted with land portions 145a, 145b of floating pistons 145, and floating piston 145 is moved, when the predetermined pressure difference overcoming the load of springs 146, 147 is generated between damper chambers 143 and 144. Except for it, other configuration and acting are same as those of FIG. 2, and then their detail explanation are omitted herein. Only, the part members same as those of FIG. 2 have the reference adding 100 to the reference used in FIG. 2.

While a preferred embodiment of the present invention has been described, the present invention should not be limited to the configuration of the embodiments and obviously variations and modifications may not be properly allowed without the appended claim.

According to the present invention, as the piston is moved by the pressure difference between both of damper chambers, the ejecting pulsation of one system is transmitted/absorbed through the piston to the passage of the ejecting side in the other system having the phase difference of the half period. Therefore, each of the ejecting pulsation can be reduced by half without influencing on the fluid pressure of the operating fluid from the pressure generator and the roar sound of the circuit can be decreased.

Also, according to the present invention, the ejecting pulsation can be reduced to advance the pedal feeling.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An anti-skid braking system having two independent fluid pressure circuits comprising;
   a master cylinder;
   a pressure generator including fluid pressure pumps powered by a common motor for supplying fluid pressure to each of the fluid pressure circuits, the fluid pressure pumps located between a low pressure reservoir and said master cylinder, the independent fluid pressure circuits having a phase difference of a half period with respect to the fluid pressure therein; and
   a pressure reducer having a body with an inner opening for permitting outlet passages of the pressure generator to communicate with each other, a reciprocating piston disposed in the inner opening of the body so as to form a pair of damper chambers at each end of the piston, movement of the piston in response to the common motor transmits the fluid pressure to alternately discharge from said pressure generator.

2. A fluid pressure circuit as claimed in claim 1, wherein
   each of the first conduit passages connected to brake master cylinders;
   each of second conduit passages connected to brake wheel cylinders;
   said low pressure reservoir being able to receive a predetermined amount of fluid pressure;
   a supplying switchable valve for controlling the opening/closing of the communication between each of first conduit passages and each of second conduit passages; and
   a discharging switching valve for controlling the opening/closing of the communication between each of second conduit passages and said reservoir, in which the outlet of passages on the ejecting side of said pressure generator is connected to each of first conduit passages through a check valve for allowing the fluid to flow into first conduit passages, while each of the passages on the ejecting side of said pressure generator is connected to said reservoir.

3. A fluid pressure circuit as claimed in claim 2, wherein;
   springs are elastically mounted in each of damper chambers of said reduction means in oppositive to each other by installing said piston in said damper chamber.

4. A fluid pressure circuit as claimed in claim 3, wherein;
   said check valve is integrally mounted in the body of said reduction means.

5. A fluid pressure circuit as claimed in claim 4, wherein;

a piston of said reduction means is provided with a pair of land portions being guided in the inner hole of the body, 0 ring is fixedly inserted into each of land portions, and both sides of which are narrowed between backup rings, check valves are provided with seat members inserted fluid-tightly into holes which are respectively perforated on said body in the middle of each of outlets, ball valve member seated mountably on the seat surface of the opening on the side of first conduit passages which are formed in each of seat members, and springs coupled at the end to plugs, which are inserted/coupled into the opening of holes formed in the body in the middle of outlets, to apply the elastic force toward the direction seating each of ball valve members on the seat surface.

6. A fluid pressure circuit as claimed in claim 5, wherein;

cup type members are inserted into the opening of the inner hole in the passage of said seat member, an orifice being formed in each of said cup type members.

7. A fluid pressure circuit as claimed in claim 3, wherein;

inner holes formed in the body of the reduction means are in the form of the step having the large diameter portion and the small diameter portion, land portions of the floating piston are guided into small diameter portions, each of damper chambers is formed in large diameter portions, and retainers engaged with the step of the inner holes by means of springs being elastically inserted into each of damper chambers are respectively contacted with land portions.

8. A fluid pressure circuit as claimed in claim 2, wherein;

inhaling switchable valves comprise the electromagnetic opening/closing valve of two boats-two places which forces first conduit passage and second conduit passage to be communicated with each other during being deenergized and to interrupt them during being energized, said discharging switchable valves are the electromagnetic valve of two boats-two places which interrupts the communication between each of second conduit passage and reservoirs during being deenergized as well as allows the communication between each of second conduit passages and reservoirs during being energized.

9. A fluid pressure circuit as claimed in claim 2, wherein;

said pressure generator is provided with a plunger pump facing against each other and an electrical power motor for operating said pump.

* * * * *